(12) United States Patent
Miyazaki et al.

(10) Patent No.: US 9,464,964 B2
(45) Date of Patent: Oct. 11, 2016

(54) RIM REPLACING DEVICE IN TIRE BALANCE MEASURING DEVICE

(75) Inventors: Shinichi Miyazaki, Akashi (JP); Kazuo Nakayama, Akashi (JP); Takaaki Ito, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 114 days.

(21) Appl. No.: 14/238,256

(22) PCT Filed: Jul. 23, 2012

(86) PCT No.: PCT/JP2012/004650
§ 371 (c)(1),
(2), (4) Date: Feb. 11, 2014

(87) PCT Pub. No.: WO2013/021555
PCT Pub. Date: Feb. 14, 2013

(65) Prior Publication Data
US 2014/0191480 A1   Jul. 10, 2014

(30) Foreign Application Priority Data

Aug. 11, 2011   (JP) .................................. 2011-175570

(51) Int. Cl.
  *G01M 17/013* (2006.01)
  *G01M 17/02* (2006.01)
  *G01M 1/16* (2006.01)

(52) U.S. Cl.
  CPC .............. *G01M 17/021* (2013.01); *G01M 1/16* (2013.01); *G01M 17/02* (2013.01); *Y10T 279/26* (2015.01)

(58) Field of Classification Search
  CPC . G01M 17/013; G01M 17/02; G01M 17/021
  USPC .................................... 73/146, 146.2, 115.07
  See application file for complete search history.

(56) References Cited

U.S. PATENT DOCUMENTS

| | | | | | |
|---|---|---|---|---|---|
| 5,259,242 | A | * | 11/1993 | Folta | G01M 17/021 157/13 |
| 6,131,455 | A | * | 10/2000 | Matsumoto | G01M 1/045 73/146 |
| 7,320,352 | B2 | * | 1/2008 | Hirata | B60B 21/04 157/1.35 |
| 7,357,170 | B2 | * | 4/2008 | Hirata | B60B 25/00 157/1.35 |
| 2005/0173039 | A1 | * | 8/2005 | Hirata | B60B 21/04 152/396 |
| 2006/0099285 | A1 | * | 5/2006 | Mitamura | B29D 30/0643 425/58.1 |
| 2011/0226050 | A1 | * | 9/2011 | Nakayama | G01M 17/021 73/146 |
| 2012/0126452 | A1 | * | 5/2012 | Feller | B29D 30/0643 264/237 |
| 2014/0007679 | A1 | * | 1/2014 | Kanei | G01M 1/06 73/460 |

FOREIGN PATENT DOCUMENTS

| | | |
|---|---|---|
| CN | 2888428 | 4/2007 |
| JP | 2-44228 | 2/1990 |
| JP | 4-310838 | 11/1992 |
| JP | 5-18865 | 1/1993 |
| JP | 8-15074 | 1/1996 |
| JP | 2000-111455 | 4/2000 |
| JP | 2004-271704 | 9/2004 |

\* cited by examiner

*Primary Examiner* — Eric S McCall
(74) *Attorney, Agent, or Firm* — Norris McLaughlin & Marcus, P.A.

(57) ABSTRACT

A lower side coupling of a Hirth coupling is coaxially coupled and fixed to a spindle, an upper side coupling of the Hirth coupling is coaxially coupled and fixed to a lower rim, the upper side coupling of the lower rim is meshed with the lower side coupling of the spindle, and upward separation of the lower rim from the spindle is prevented by chuck mechanisms.

4 Claims, 10 Drawing Sheets

RIM REPLACING DEVICE IN TIRE BALANCE MEASURING DEVICE

BACKGROUND OF THE INVENTION

The present invention relates to a rim exchange device in a tire balance measurement apparatus.

In a tire balance measurement apparatus (dynamic balancer) for measuring dynamic balance of a tire, after the tire to be subjected to measurement is carried and loaded into a lower rim coupled and fixed to a spindle, an upper rim standing by on the upper side is lowered by a lifting and lowering device, and the tire is nipped by the lower rim and the upper rim from the upper and lower sides. By charging the air into the tire to inflate the tire in this state and driving and rotating the spindle, the dynamic balance of the tire is measured (for example, refer to JP 8-15074 A).

SUMMARY OF THE INVENTION

In such a tire balance measurement apparatus, in a case where the size of the tire to be subjected to measurement is changed, there is a need for exchanging the upper and lower rims. Conventionally, the lower rim is coupled to the spindle by bolts. At the time of exchanging the lower rim, after a new lower rim is temporarily fastened to and installed in the spindle by bolts, centering is performed by using a dial gauge while turning the lower rim, and then the bolts are refastened to couple and fix the lower rim to the spindle.

When the lower rim is coupled and fixed to the spindle by the bolts in such a way, an unbalance state of a rotation part of the tire balance measurement apparatus itself is changed. Thus, in order to perform highly precise measurement, there is a need for performing a correction task again. This correction task is troublesome because there is a need for a task of measuring the dynamic balance in a state where a weight having a predetermined load is attached to the upper rim or the lower rim.

In such a way, in the conventional rim exchange, there is a need for a centering task of the lower rim and a re-correction task. Thus, the rim exchange is time-consuming and inconvenient, and working efficiency of the measurement apparatus and a measurement line is lowered.

The present invention is achieved focusing on such a situation, and an object thereof is to easily and promptly exchange a rim without requiring time-consuming and inconvenient centering fixing and re-correction tasks.

In order to achieve the above object, the present invention is formed as follows.

(1) The present invention is a rim exchange device in a tire balance measurement apparatus for driving and rotating upper and lower rims nipping a tire by a spindle coupled to the lower rim and measuring dynamic balance of the tire, the rim exchange device including a coupling having an automatic alignment function, and a chuck mechanism, wherein the coupling has an upper side coupling coaxially coupled and fixed to the lower rim, and a lower side coupling coaxially coupled and fixed to the spindle, the upper side coupling is meshed with the lower side coupling, and the chuck mechanism prevents upward separation of the lower rim from the spindle.

As the coupling having the automatic alignment function, for example, a Curvice coupling and a Hirth coupling can be used.

According to the present invention, the upper side coupling of the coupling having the automatic alignment function is coaxially coupled and fixed to the lower rim, while the lower side coupling is coaxially coupled and fixed to the spindle. Thus, only by lowering the lower rim above the spindle and mounting the lower rim on the lower side coupling of the spindle, the upper side coupling of the lower rim is meshed with the lower side coupling. That is, teeth of the upper side coupling of the lower rim are meshed with teeth of the lower side coupling. Thereby, the lower rim is precisely aligned with the spindle by the automatic alignment function of the coupling. After that, by fixing the lower rim by using the chuck mechanism, coupling and fixing of the lower rim to the spindle are completed. In such a way, precise alignment can be performed with favorable reproducibility by the automatic alignment function of the coupling. Thus, there is no need for a centering task and a re-correction task. Since the lower rim is fixed to the spindle by the chuck mechanism, there is no need for a bolt fastening task for fixing the lower rim.

(2) In a preferred mode of the present invention, the chuck mechanism has a lock member provided in the lower rim, and an engagement member provided on the spindle side and engaged with the lock member.

According to this mode, the engagement member on the spindle side is engaged with the lock member of the lower rim, so that the lower rim is coupled and fixed to the spindle. Thus, after the lower rim is aligned and mounted via the coupling, a time-consuming and inconvenient task such as the bolt fastening task for coupling and the fixing the lower rim to the spindle is not required. As a result, a time in which a measurement task is suspended for rim exchange is shortened, and working efficiency of a measurement line is enhanced.

(3) In the mode (2), an actuator for driving and operating the engagement member may be further provided.

According to this mode, by automatically controlling or remotely controlling the actuator, the rim can be fixed to or released from the spindle for a further short time. Thus, a rim exchange time can be shortened.

(4) In still another mode of the present invention, detection means for detecting meshing failure between the upper side coupling and the lower side coupling is provided.

According to this mode, based on detection of the meshing failure, the following actions can be automatically stopped or notified.

(5) In yet another mode of the present invention, the upper rim to be lifted and lowered is capable of supporting and suspending the lower rim.

According to this mode, the lower rim can be carried in and out at the time of the rim exchange by utilizing lifting and lowering actions of the upper rim originally provided in order to nip the tire by the upper and lower rims. Thus, there is no need for carry-in and carry-out means exclusive for the lower rim.

In such a way, according to the present invention, the rim exchange can be easily and promptly performed without requiring inconvenient and bothersome centering, re-correction, and bolt fastening tasks.

DETAILED DESCRIPTION OF THE INVENTION

Figure 1:
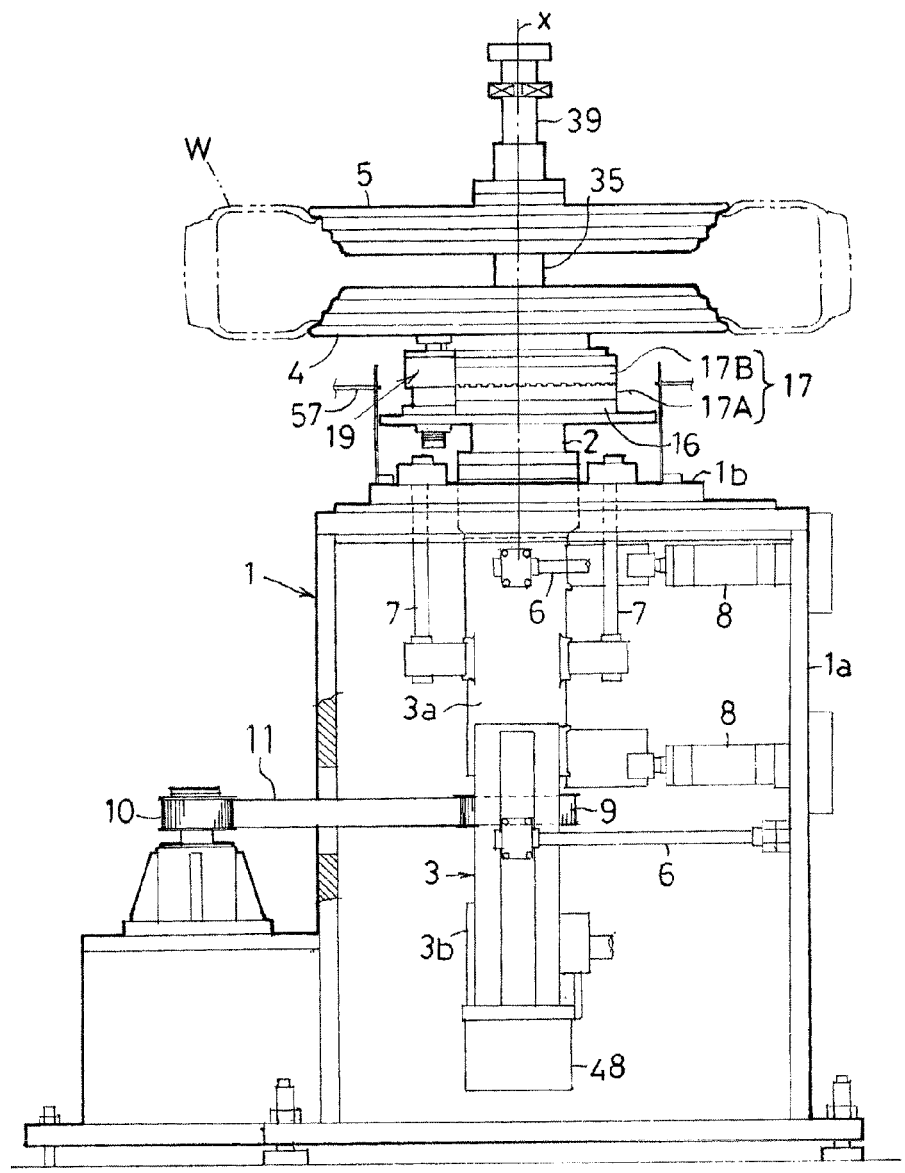
FIG. 1 is a side view of a tire balance measurement apparatus.
Figure 2:
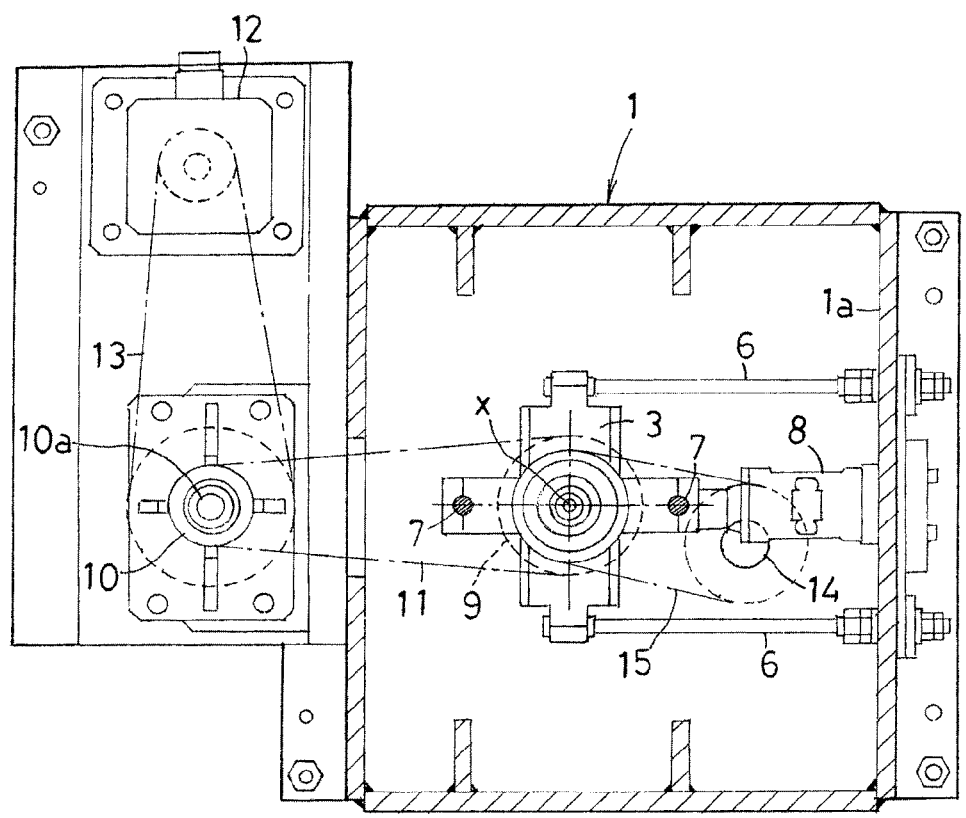
FIG. 2 is a cross sectional plan view of the tire balance measurement apparatus.
Figure 3:
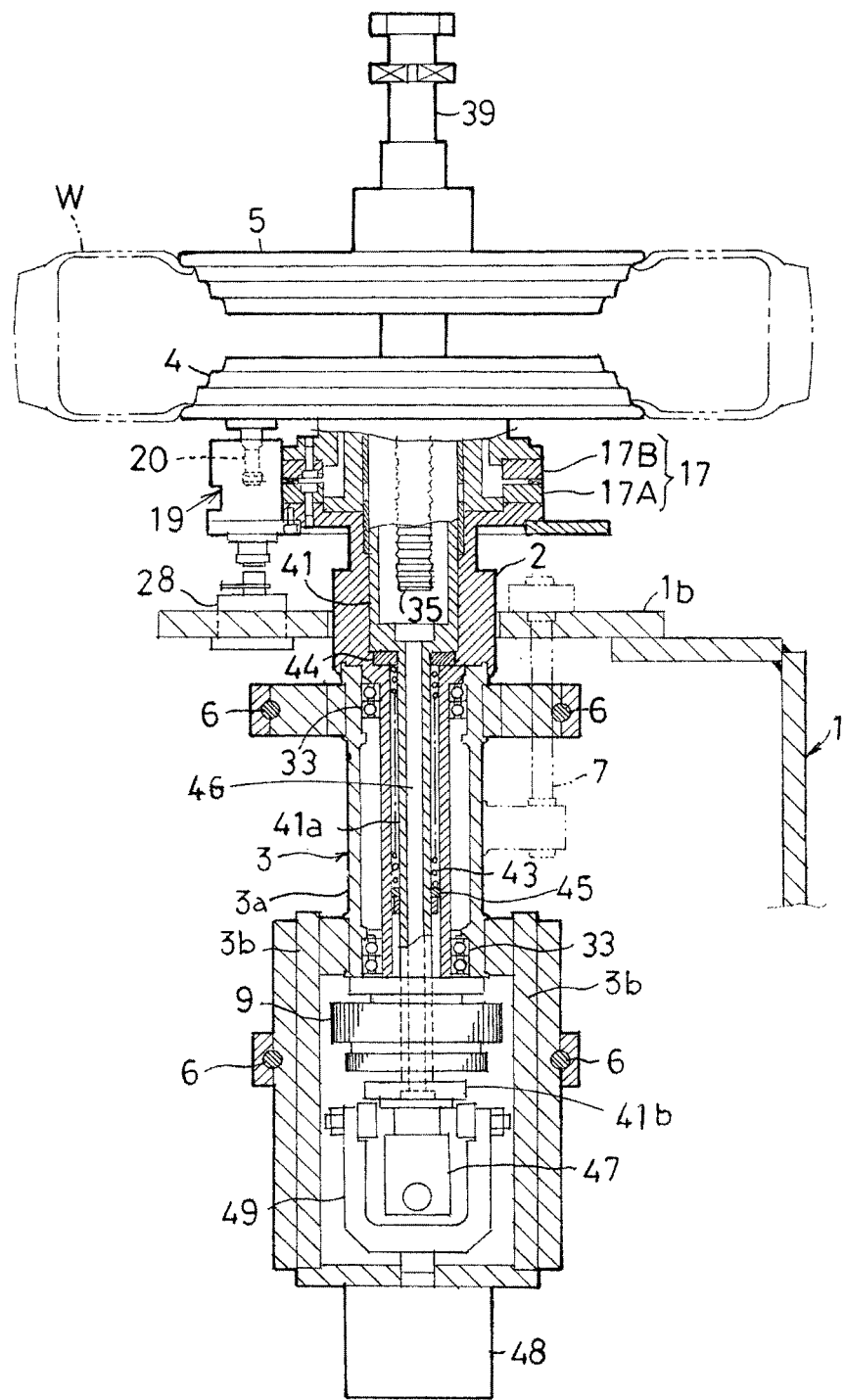
FIG. 3 is a vertically sectional front view showing major parts of the tire balance measurement apparatus.

Hereinafter, an embodiment of the present invention will be described in detail with reference to the drawings. FIG. 1 shows a side view of a tire balance measurement apparatus of the embodiment of the present invention, FIG. 2 shows a cross sectional plan view of the apparatus, and FIG. 3 shows a vertically sectional front view of major parts of the apparatus. This tire balance measurement apparatus has a cylindrical support casing 3. The support casing 3 has a vertically-inserted and supported spindle 2. The support casing 3 is arranged in a center part of a main frame 1 fixed while standing. A lower rim 4 is coupled to an upper part of the spindle 2 protruding from an upper surface of the main frame 1. Further, an upper rim 5 facing the lower rim 4 while having a predetermined gap is arranged to be lifted and lowered.

In the tire balance measurement apparatus with the above configuration, after a tire W carried in a horizontal posture is fitted and loaded into the lower rim 4 in a state where the upper rim 5 stands by on the upper side, the upper rim 5 is lowered and the tire W is nipped by the lower rim 4 and the upper rim 5. After that, the air is charged into the tire W to inflate the tire up to predetermined pressure. In this state, the spindle 2 is driven and rotated. At this time, variation of a horizontal load generated in the support casing 3 is detected. Thereby, dynamic balance of the tire W is measured.

The main frame 1 is formed into a rectangular box shape. Two upper and lower parts of the support casing 3 and a side wall 1a of the main frame 1 are coupled to each other via a pair of left and right torsion bars 6 horizontally arranged in parallel. A vertically middle part of the support casing 3 and an upper wall 1b of the main frame 1 are coupled to each other via a pair of vertically arranged front and rear torsion bars 7. Load cells 8 for detecting the variation of the load are disposed between two upper and lower parts of the support casing 3 and the side wall 1a of the main frame 1.

The support casing 3 includes a tubular portion 3a. A pair of facing plate shape bodies 3b, 3b is continuously provided in a lower part of this tubular portion 3a. As shown in FIG. 3, the spindle 2 is supported on the tubular portion 3a of the support casing 3 via two pairs of upper and lower bearings 33 to be turnable about the vertical axis x.

The plate shape bodies 3b, 3b face each other in a lower part of the support casing 3, and a lower end of the spindle 2 extends between the plate shape bodies 3b, 3b. A pulley 9 is provided in the extending end (lower end) of the spindle 2. The pulley 9 is looped over an intermediate pulley 10 arranged on the outer side of the main frame 1 via a toothed belt 11 without any slip. Thereby, both the pulleys 9, 10 are interlocked with each other. As shown in FIG. 2, an intermediate pulley shaft 10a of the intermediate pulley 10 is looped over a servomotor 12 via a belt 13 without any slip. Thereby, the intermediate pulley shaft 10a is interlocked with the servomotor 12. The spindle 2 is looped over a rotary encoder 14 via a belt 15 without any slip, and the spindle 2 and the rotary encoder 14 are interlocked with each other at equal speed. Thereby, a rotation position of the spindle 2 is detected by the rotary encoder 14.

Figure 4:
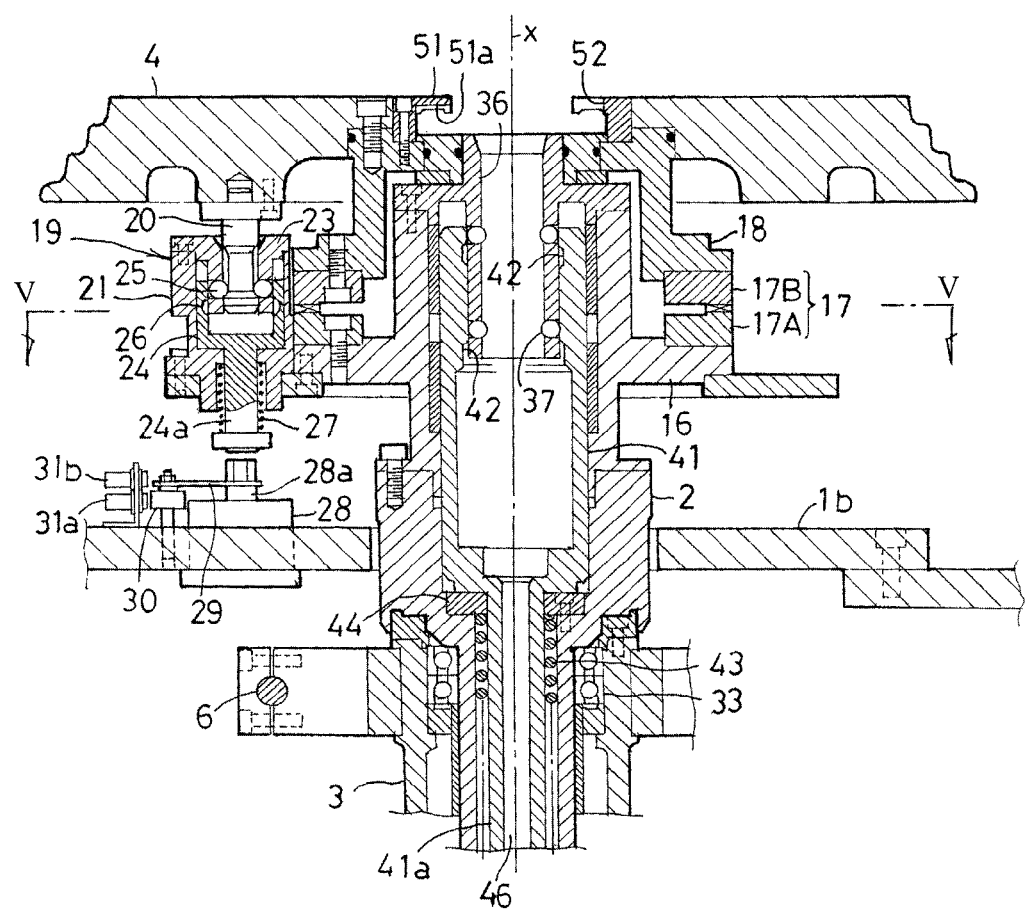
FIG. 4 is a vertically sectional front view showing a coupling part of a lower rim.

As shown in FIGS. 1, 3, and 4, the upper part of the spindle 2 protrudes upward over the support casing 3 and the upper wall 1b of the main frame 1. A flange 16 for installing the lower rim is provided in the protruding part (upper part) of the spindle 2. A lower side coupling 17A of a Hirth coupling 17 is coupled to an upper surface of this flange 16 by bolts coaxially with the spindle 2. The Hirth coupling 17 is a coupling having an automatic alignment function. An upper side coupling 17B of the Hirth coupling 17 is coaxially coupled to the lower rim 4 by bolts via a bracket 18 coupled to a lower surface of the lower rim 4.

Teeth are formed in a radial manner in an upper surface circumferential part of the lower side coupling 17A, and teeth are formed in a radial manner in a lower surface circumferential part of the upper side coupling 17B. The lower side coupling 17A and the upper side coupling 17B are meshed in the up and down direction and coaxially combined with each other. Thereby, the Hirth coupling 17 has the automatic alignment function with which the coupling is not relatively moved in the circumferential, front and rear, and left and right directions. Therefore, only by lowering the lower rim 4 from the upper side of the spindle 2, placing the upper side coupling 17B onto the lower side coupling 17A on the flange 16, and meshing the couplings, the lower rim 4 is brought into a coaxial state with the spindle 2 with high precision and favorable reproducibility by the automatic alignment function of the Hirth coupling 17. In such a way, since the lower rim 4 and the spindle 2 are coaxially combined with each other with high precision, there is no need for separately performing a centering task. Furthermore, since the lower rim and the spindle are coaxially combined with high reproducibility, a correction task performed for correcting an unbalance amount of a rotation part of the tire balance measurement apparatus itself is once performed but not required to be performed again.

This tire balance measurement apparatus has a pair of chuck mechanisms 19. The chuck mechanisms 19 are to couple and fix the lower rim 4 installed coaxially with the spindle 2 as described above to the spindle 2, and are provided at diagonal positions with respect to the axis x of the spindle 2 as shown in FIG. 5 serving as a sectional view by line A-A in FIG. 4.

Figure 5:
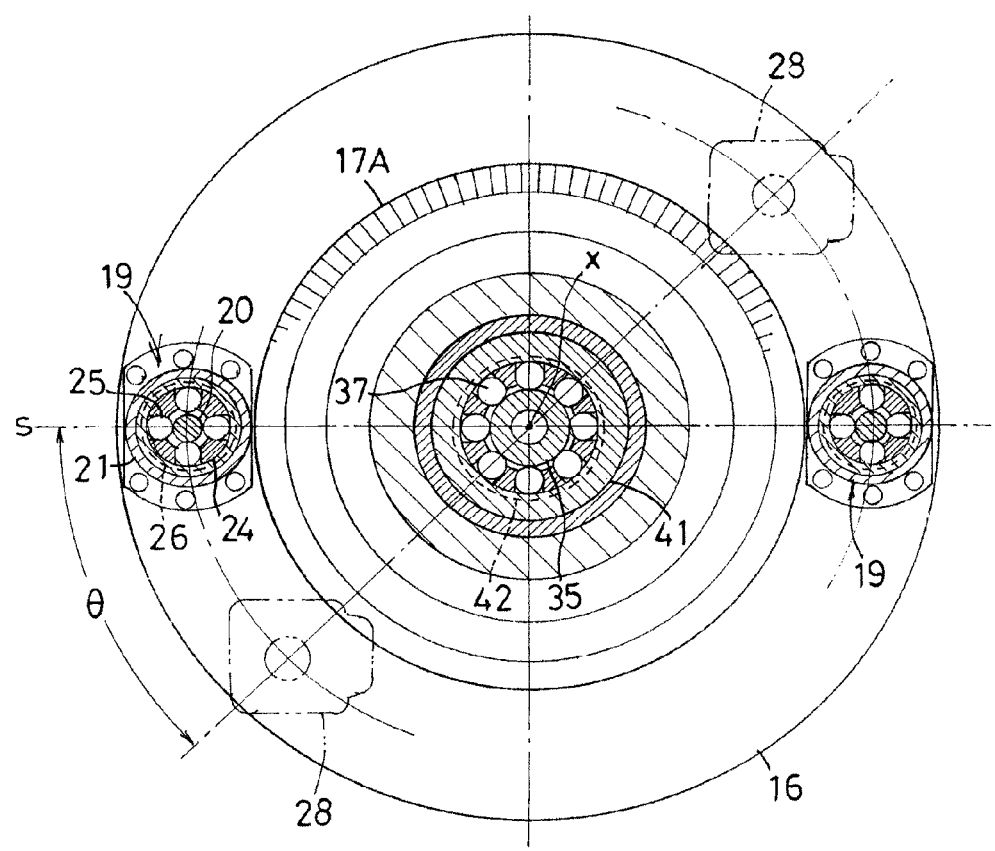
FIG. 5 is a sectional view by line V-V in FIG. 4.

As shown in FIGS. 4, 5, in each of the chuck mechanisms 19, by inserting a lock pin 20 serving as a lock member protruding downward from the lower surface of the lower rim 4 into a support case 21 arranged in and fixed to an outer circumferential part of the flange 16, upward escape of the lock pin 20 is prevented. Thereby, the chuck mechanism 19 couples and fixes the lower rim 4.

Figure 7:
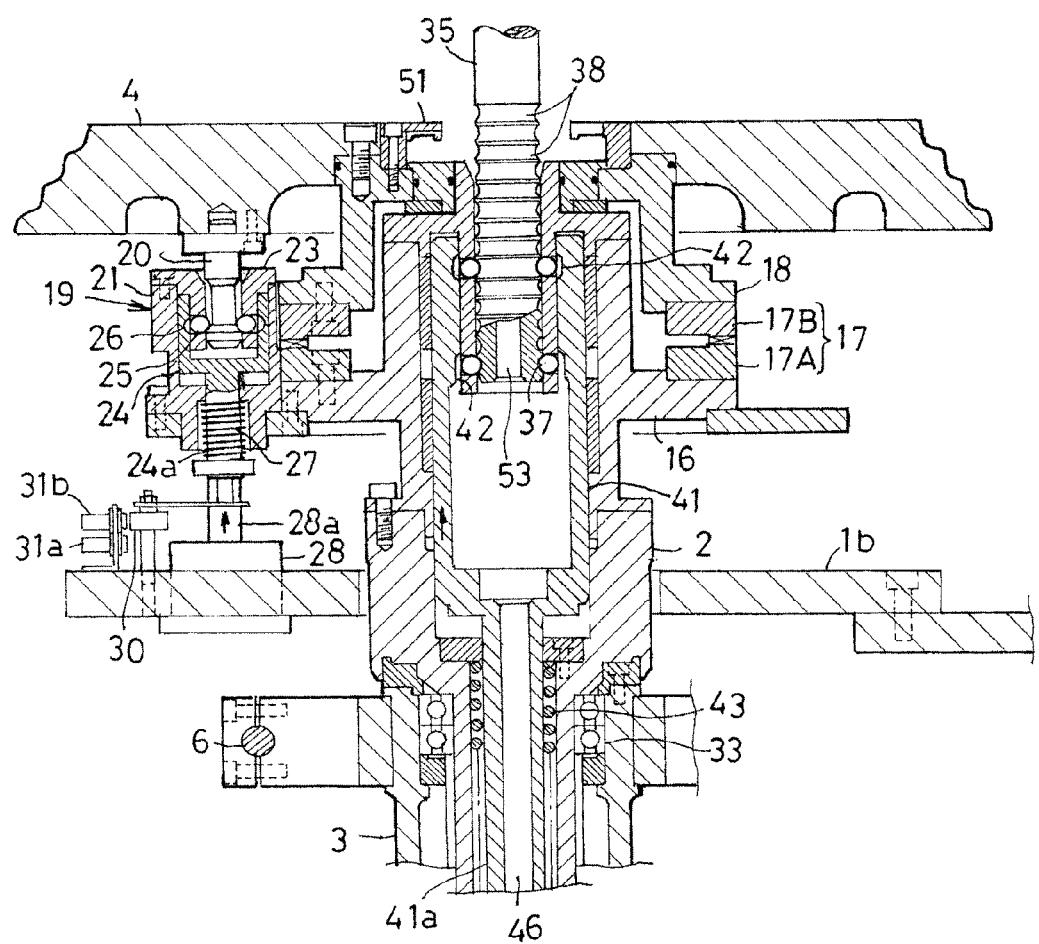
FIG. 7 is a vertically sectional front view of major parts showing a state where rim coupling lock is cancelled.
Figure 10:
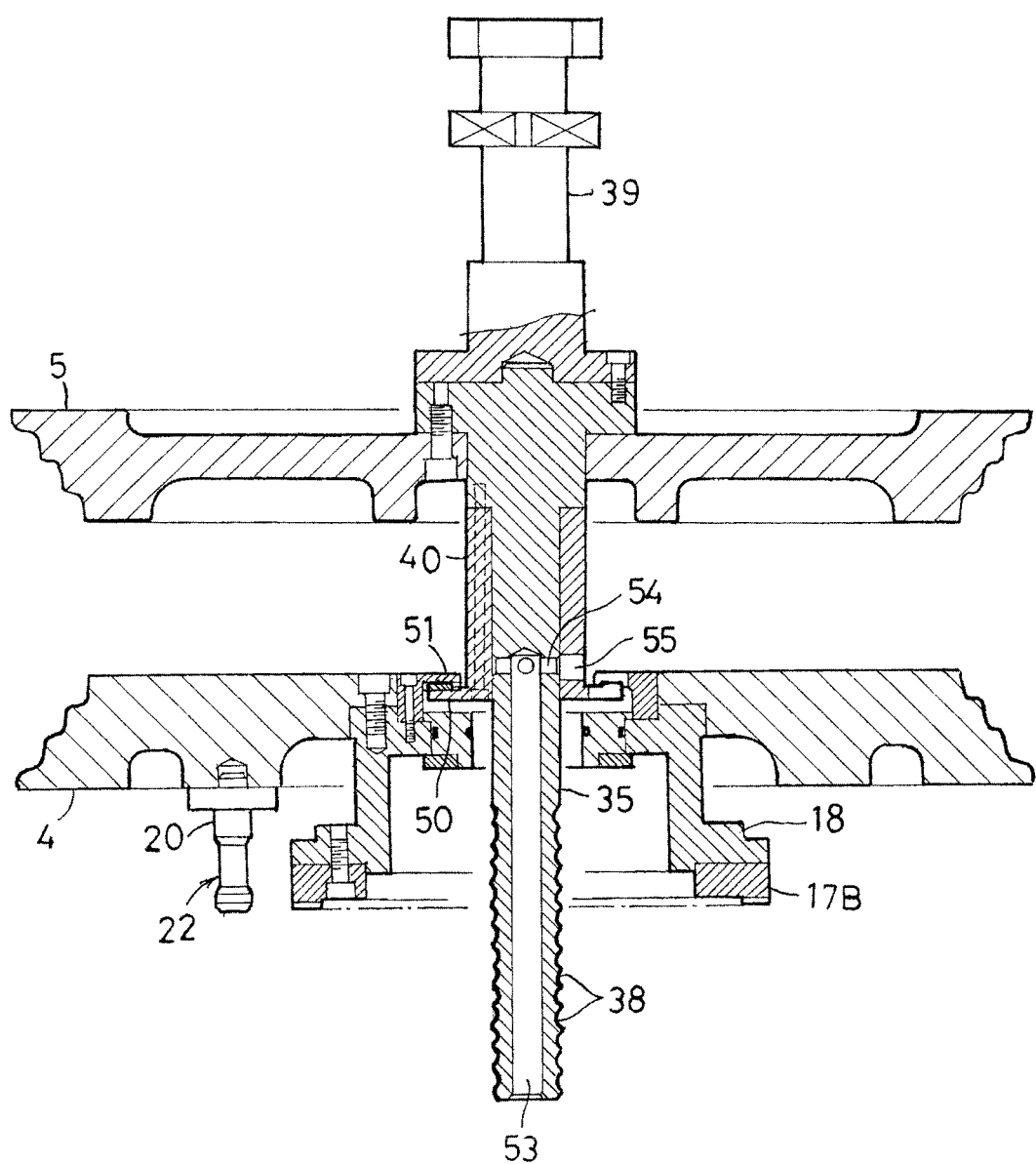
FIG. 10 is a vertically sectional front view showing a state where the lower rim is hanged on and supported by the upper rim.

As shown in FIG. 10, an annular engagement groove 22 is provided in the lock pin 20, and as shown in FIGS. 4, 5, and 7, a support boss 23 into which the lock pin 20 can be inserted from the upper side, and an operation tube 24 fitted onto this support boss 23 to be slidable in the up and down direction are provided in the support case 21.

Plural (four in this example) lock balls 25 are assembled into the support boss 23 at equal pitches in the circumferential direction as engagement members. The lock balls 25 are inserted into the support boss 23 from the outer circumference of the support boss, and arranged to be movable inward and outward in the radial direction. When the lock balls 25 are moved inward in the radial direction of the support boss 23, a part of the lock balls 25 protrudes from the inner circumference of the support boss. When the lock balls 25 are moved outward in the radial direction of the support boss 23, the lock balls 25 are retreated outward in the radial direction from the inner circumference of the support boss. It should be noted that a radially inner end of a ball insertion hole formed in the support boss 23 is slightly smaller than a ball diameter, so that the lock balls 25 do not fall inside the support boss 23.

An annular groove 26 is provided on an inner circumferential surface of the operation tube 24. When the operation tube 24 slides downward in the figure, the annular groove 26 is moved to the lower side of the lock balls 25, so that the annular groove 26 and the lock balls 25 are disengaged from each other. Thereby, the lock balls 25 are abutted with the operation tube 24, and outward movement thereof is prevented by the operation tube 24. Meanwhile, when the operation tube 24 slides upward, the annular groove 26 faces the lock balls 25, so that a radially outward movement space for the lock balls 25 is formed. That is, when the operation tube 24 is placed at a lower sliding position, the lock balls 25 protrude inward in the radial direction and are retained in a lock state. On the other hand, when the operation tube 24 is placed at an upper sliding position, the lock balls 25 are allowed to be retreated outward in the radial direction in a lock cancellation state.

Therefore, as shown in FIG. 7, by moving the operation tube 24 to the upper sliding position in the lock cancellation state, the lock pin 20 can be inserted into and drawn from the support boss 23. Meanwhile, by moving the operation tube 24 to the lower sliding position in the lock state while the lock pin 20 is inserted into the support boss 23, the lock balls 25 pushed inward in the radial direction by the operation tube 24 come into the engagement groove 22 of the lock pin 20, so that the upward escape of the lock pin 20 is prevented. As a result, a coupling state of the lower rim 4 is maintained.

The operation tube 24 for performing the lock and the lock cancellation described above is driven to slide. That is, a shaft portion 24a extending from a lower end of the operation tube 24 protrudes downward, and the operation tube 24 is biased to slide toward a lower position, that is, a lock position by a compressed coil spring 27 fitted and installed onto this shaft portion 24a. It should be noted that as shown in FIG. 5, a turning phase when a diagonal line connecting the centers of the pair of chuck mechanisms 19 formed as above is placed along the front and rear direction of the apparatus is a reference position s of the spindle 2 and the lower rim 4.

Figure 6:
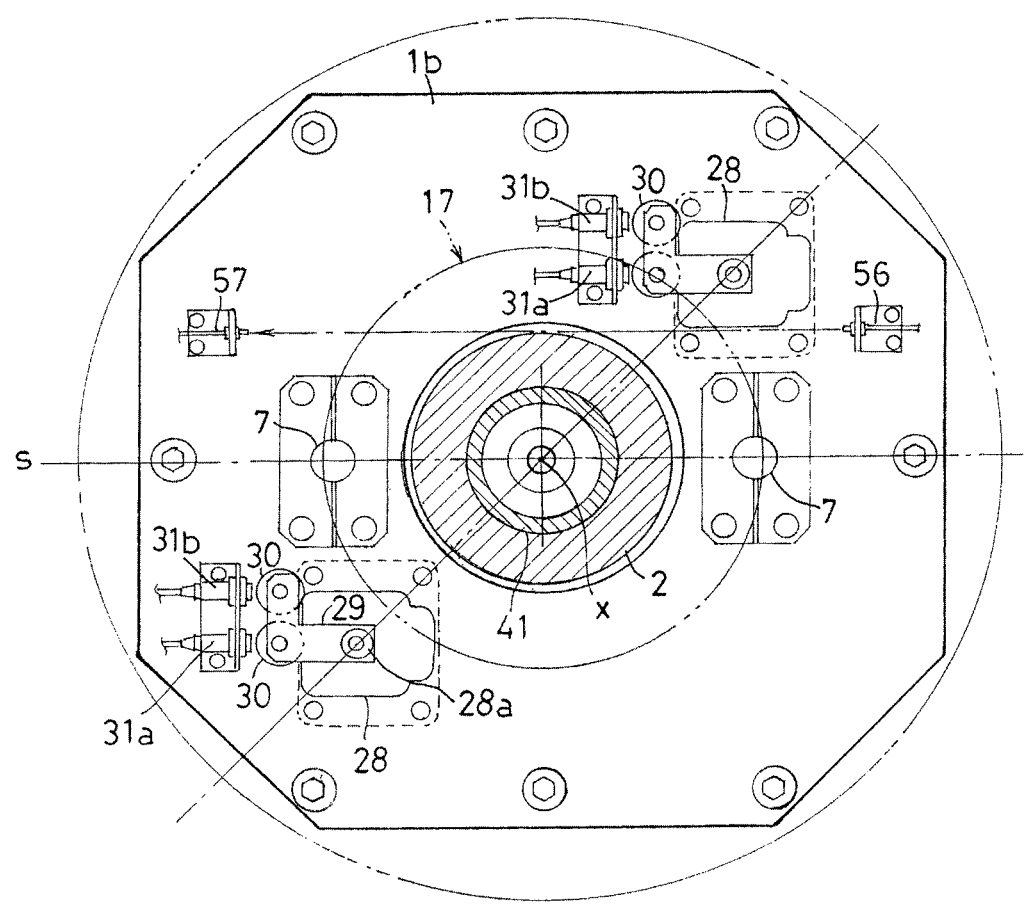
FIG. 6 is a plan view showing an upper surface of a main frame.

As shown in FIG. 6, air cylinders 28 are arranged on the upper wall 1b of the main frame 1 to face the upper side as actuators for operating the pair of chuck mechanisms. Each of the air cylinders 28 is arranged as follows. That is, as shown in FIG. 5, the air cylinder 28 is installed in such a manner that the shaft portion 24a of the operation tube 24 is positioned on the cylinder center when the spindle 2 is placed at a position where the spindle 2 is rotated anticlockwise by a predetermined angle θ (45 degrees in this example) from the reference position s. In a state where the spindle 2 is placed at this rotation position, by letting a piston rod 28a of the air cylinder 28 protrude upward to raise the shaft portion 24a, the operation tube 24 is moved to the upper sliding position against the compressed coil spring 27, so that the chuck mechanism 19 is brought into the lock cancellation state. In the lock cancellation state, the lock pin 20 can be inserted and drawn.

It should be noted that as shown in FIGS. 4, 6, a pair of detection pieces 30 made of magnetic metal is provided in a stator 29 coupled to the piston rod 28a, and a pair of upper and lower proximity switches 31a, 31b for sensing proximity of the detection pieces 30 is arranged on the upper wall 1b of the main frame. Thereby, based on position detection of the piston rod 28a, it is determined whether the chuck mechanism 19 is in the lock state or the lock cancellation state.

The spindle 2 is formed into a cylindrical shape. As shown in FIGS. 3, 4, and 7, a coupling shaft 35 extends downward from the center of the upper rim 5, and a flanged cylinder shaft 36 inserted into this coupling shaft 35 is coaxially coupled and fixed to an upper end of the spindle 2. As shown in FIG. 5, plural (eight in this example) lock balls 37 are assembled in each of upper and lower parts of this flanged cylinder shaft 36 at fixed pitches in the circumferential direction.

Figure 8:
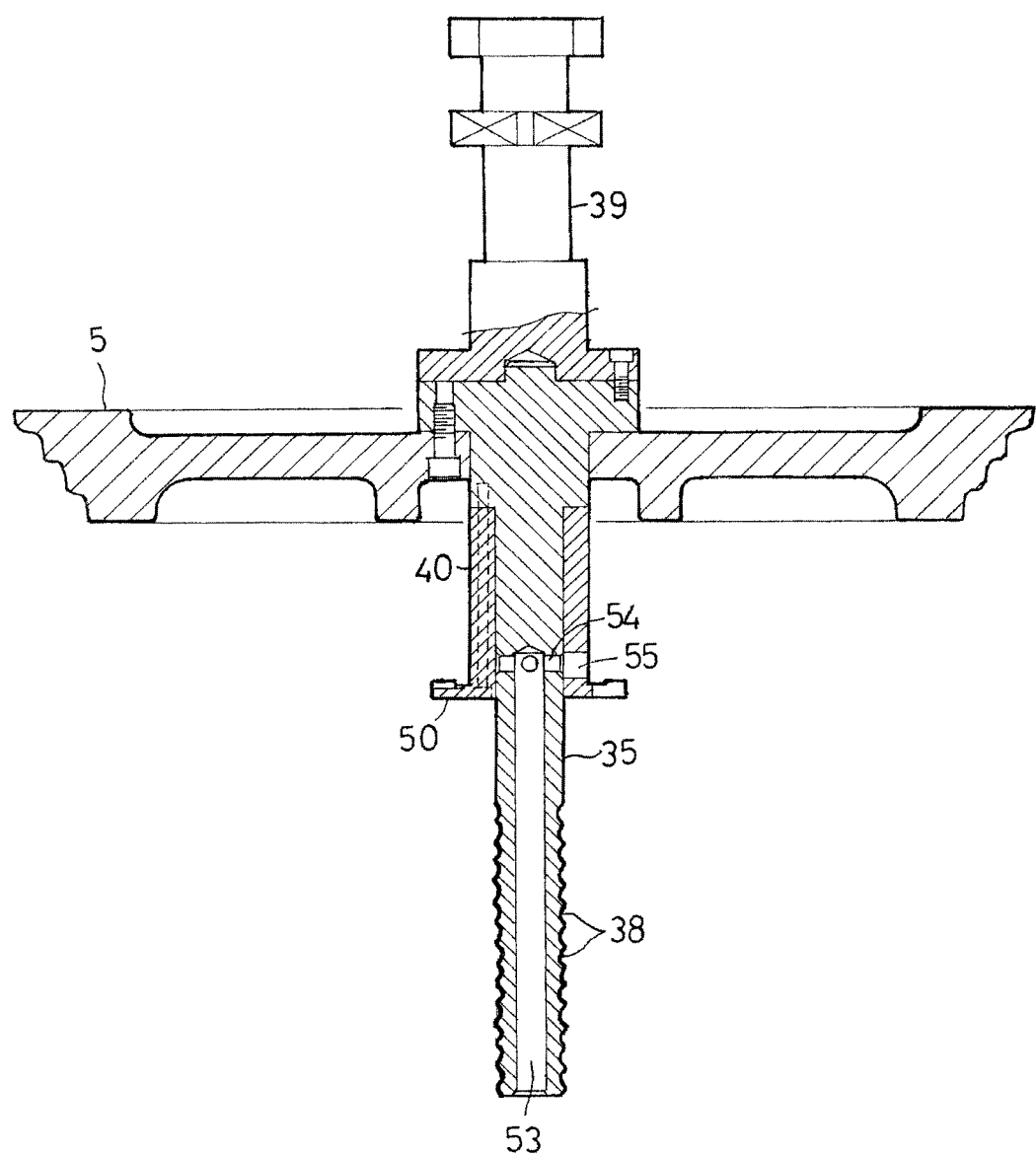
FIG. 8 is a vertically sectional front view of a single body of an upper rim.

As shown in FIGS. 7, 8, a large number of annular engagement grooves 38 to which the two upper and lower groups of lock balls 37 come in are formed on the outer circumference of a lower part of the coupling shaft 35 at fixed pitches. It should be noted that a grip shaft 39 to be gripped, retained, and suspended by a chuck mechanism of a lifting and lowering device (not shown) is coupled to an upper end of the coupling shaft 35. A lower rim support shaft 40 to be utilized at the time of rim exchange is fitted and coupled onto the coupling shaft 35. Functions of this lower rim support shaft 40 will be described later.

The lock balls 37 are inserted into a circumferential wall of the flanged cylinder shaft 36 from the outer circumference to be movable inward and outward in the radial direction. When the lock balls 37 are moved inward in the radial direction, a part of the lock balls 37 protrudes inward from the inner circumference of the flanged cylinder shaft 36. In this state, in a case where the coupling shaft 35 is inserted into the flanged cylinder shaft 36, the lock balls 37 come into the engagement grooves 38 of the coupling shaft 35. When the lock balls 37 are moved outward in the radial direction, the lock balls 37 are retreated outward in the radial direction from the inner circumference of the flanged cylinder shaft 36. In this state, in a case where the coupling shaft 35 is inserted into the flanged cylinder shaft 36, the coupling shaft 38 is allowed to be inserted and drawn. It should be noted that radially inner ends of ball insertion holes into which the lock balls 37 are inserted are slightly smaller than a ball diameter of the lock balls 37. Even in a state where the coupling shaft 35 is not inserted into the flanged cylinder shaft 36, the lock balls 37 do not fall inside the flanged cylinder shaft 36.

As shown in FIGS. 4, 7, an operation cylinder shaft 41 is fitted onto the flanged cylinder shaft 36 to be slidable upward and downward. Annular grooves 42 are provided in two upper and lower parts on an inner circumferential surface of the operation cylinder shaft 41. When the operation cylinder shaft 41 slides downward, the annular grooves 42 are removed downward from the lock balls 37. Thus, a circumferential surface of the operation cylinder shaft 41 is abutted with the lock balls 37 and radially outward movement of the lock balls 37 is prevented. When the operation cylinder shaft 41 slides upward, the annular grooves 42 face the lock balls 37, so that a space in which the lock balls 37 can be moved outward in the radial direction is formed. That is, when the operation cylinder shaft 41 is placed at a lower sliding position, the lock balls 37 protrude inward in the radial direction and are retained in a lock state. On the other hand, when the operation cylinder shaft 41 is placed at an upper sliding position, the lock balls 37 are allowed to be retreated outward in the radial direction in a lock cancellation state.

As shown in FIG. 3, a small diameter shaft portion 41a extends from a lower end of the operation cylinder shaft 41, and this small diameter shaft portion 41a extends to a place between the facing plate shape bodies 3b, 3b in the lower part of the support casing 3. The operation cylinder shaft 41 and the small diameter shaft portion 41a are inserted into a hollow part of the spindle 2 to be slidable with predetermined strokes. A compressed coil spring 43 is fitted and installed onto the small diameter shaft portion 41a. A spring upper end of the compressed coil spring 43 is supported by a spring receiving collar 44 on the spindle side, and a spring lower end is supported by a spring receiving collar 45 of the small diameter shaft portion 41a. The operation cylinder shaft 41 is biased to slide toward a lock position on the lower side by elastic force of the compressed coil spring 43.

A ventilation hole 46 communicating with an interior of the operation cylinder shaft 41 is formed inside the small diameter shaft portion 41a. A rotary joint 47 connected to communicate with a pressurized air supply device (not shown) is equipped in a lower end of the small diameter shaft portion 41a. The pressurized air for inflating the tire W loaded between the upper and lower rims 4, 5 is brought from the pressurized air supply device to the rotary joint 47 and the ventilation hole 46 of the small diameter shaft portion 41a, and supplied to the interior of the operation cylinder shaft 41.

An operation flange 41b is provided near the lower end of the small diameter shaft portion 41a. An operation member 49 to be moved upward and downward by an air cylinder 48 is arranged between the facing plate shape bodies 3b, 3b in the support casing 3. When the air cylinder 48 is let protrude and the operation member 49 is moved upward, the operation flange 41b is raised by the operation member 49, so that the operation cylinder shaft 41 slides upward against the compressed coil spring 43. Thereby, the above lock cancellation state is established.

Next, the lower rim support shaft 40 fitted and coupled onto the coupling shaft 35 of the upper rim 5 as shown in FIGS. 8 and 10 will be described. Four flange claws 50 are provided in a radial manner in a lower end of the lower rim support shaft 40. The grip shaft 39 of the upper rim 5 is gripped fixedly in the circumferential direction. Thus, irrespective of lifting and lowering of the upper rim 5, the circumferential posture of the flange claws 50 is unchanged.

Figure 9A:
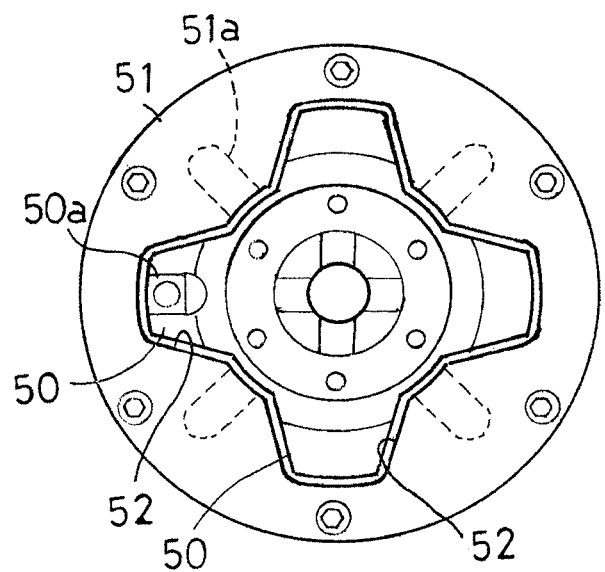
FIG. 9A is a plan view showing a hanging part of the lower rim in a hanging cancellation state.
Figure 9B:
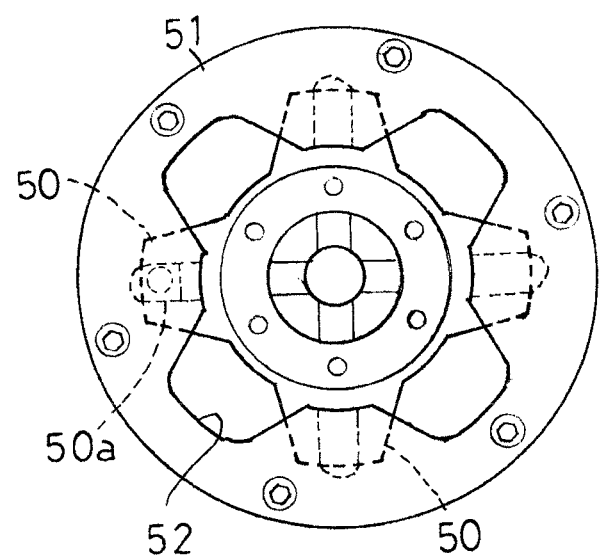
FIG. 9B is a plan view showing the hanging part of the lower rim in a hanging state.

An inward flange member 51 is secured to a center opening part of the lower rim 4. As shown in FIGS. 9A, 9B, four cutout recessed portions 52 allowing passage of the flange claws 50 are formed on the inner circumference of the inward flange member 51. As shown in FIG. 9A, in a state where the spindle 2 is placed at the preliminarily set reference position s, the flange claws 50 match with the cutout recessed portions 52. Thus, the flange claws 50 can pass through and be moved to the upper and lower sides of the inward flange member 51, so that only the upper rim 5 can be lifted and lowered.

As shown in FIG. 9B, in a state where the flange claws 50 are lowered to the lower side of the inward flange member 51, by turning the spindle 2 anti-clockwise by the predetermined angle θ from the reference position s, the flange claws 50 can be engaged with the inward flange member 51 from the lower side of the inward flange member 51. When the upper rim 5 is lifted in this state, the lower rim 4 and the flange claws 50 can be integrally lifted in a state where the lower rim 4 is hanged and supported by the flange claws 50.

Keys 50a protrude on upper surfaces of the flange claws 50. Grooves 51a into which the keys 50a are inserted are formed in a radial manner on a lower surface of the inward flange member 51. When the inward flange member 51 is hanged on the flange claws 50 and the lower rim 4 is brought up, the keys 50a and the grooves 51a are engaged with each other. Thus, the lower rim 4 is not carelessly turned while being displaced.

Major parts of the tire balance measurement apparatus are formed as above. Next, actions thereof and a rim exchange action following a change in tire size will be described.

[Tire Measurement Action]

(1) In an initially set state, the lower rim 4 is coaxially coupled and fixed to the spindle 2 and placed at the above reference position. At this time, the upper rim 5 is lifted to a stand-by position which is largely upward away from the lower rim 4.

(2) Although not shown, roller type carry-in and carry-out conveyors are provided on the left and right sides of the tire balance measurement apparatus. After the tire W to be subjected to measurement is carried in a horizontal posture, the tire is positioned by a horizontally oscillated and moved pushing roller group (not shown), and a lower side bead portion of the tire W is fitted to the lower rim 4.

(3) Next, the upper rim 5 placed at the stand-by position is lowered. In this case, on the spindle side, the operation cylinder shaft 41 is operated by the air cylinder 48 to slide upward as described above and brought into the lock cancellation state. Therefore, the coupling shaft 35 of the upper rim 5 can be inserted into the flanged cylinder shaft 36, and further, the flange claws 50 can pass through the inward flange member 51 of the lower rim 4 placed at the reference position to the lower side.

(4) When the upper rim 5 reaches a height position preliminarily set in accordance with width of the installed tire, lowering of the upper rim 5 is stopped. After that, the air cylinder 48 is retreated, and the operation cylinder shaft 41 is biased by the compressed coil spring 43 and moved to slide to the lock position on the lower side. The pitches of the engagement grooves 38 formed in the coupling shaft 35 are set in accordance with change pitches of the tire size. Thus, the two upper and lower groups of lock balls 37 respectively face any of the engagement grooves 38, and the lock balls 37 are pushed by the downward sliding operation cylinder shaft 41 and engaged with the corresponding engagement grooves 38. Thereby, positioning lock in the up and down direction of the upper rim 5 is completed.

(5) Next, the pressurized air is supplied to the spindle 2. The supplied pressurized air is supplied into the tire W via a ventilation passage 53 formed along an interior of the coupling shaft 35, a radial ventilation hole 54 formed in a far end of the ventilation passage, and a ventilation hole 55 formed in the lower rim support shaft 40 as shown in FIG. 10.

(6) When the tire W is inflated up to predetermined pressure, supply of the pressurized air is stopped. After that, the servomotor 12 is started up, the spindle 2 is rotated, and the tire W nipped by the upper and lower rims 4, 5 is rotated at predetermined speed. At this time, when the tire W is unbalanced, centrifugal force in the horizontal direction generated by the unbalance is detected by the upper and lower load cells 8 coupled to the support casing 3. The detected data is transmitted to a calculation processing device together with rotation position information from the rotary encoder 14, so that dynamic balance of the tire W is calculated and a light point position and the like are calculated.

(7) When measurement is finished, the rotation position of the spindle 2 is controlled so that the lower rim 4 is returned to the original reference position, and the tire W is deflated. After that, the operation cylinder shaft 41 is moved upward again by the air cylinder 48 and brought into the lock cancellation state. Next, the upper rim 5 is controlled to be lifted, and further, the coupling shaft 35 is drawn from the flanged cylinder shaft 36. When the flange claws 50 pass through the inward flange member 51, the upper rim 5 is restored to the original stand-by position and brought into a stand-by state for preparing next measurement processing.

(8) The tire W after measurement is moved and placed onto the conveyor and carried out. This is the end of the first measurement, and after this, the above procedure is successively repeated every time a new tire W is carried in.

[Rim Exchange Action]

(1) In a case where exchange of the upper and lower rims 4, 5 is required following the size change in the tire W to be subjected to measurement, firstly, the rotation position of the spindle 2 is controlled so that the lower rim 4 is placed at the above reference position. Further, by letting the air cylinder 48 protrude, the above lock cancellation state is established. In this state, the upper rim 5 is lowered. As a result, the flange claws 50 pass through the inward flange member 51.

(2) Next, rotation of the spindle 2 is controlled and only the lower rim 4 is rotated anti-clockwise by the predetermined angle θ (45 degrees) from the above reference position s. Thereby, as shown in FIG. 9B, each of the flange claws 50 is positioned in the middle between the adjacent cutout recessed portions 52 in the inward flange member 51. By rotating the lower rim 4 by the predetermined angle θ from the reference position s, the chuck mechanisms 19 fixing the lower rim 4 are positioned immediately above the air cylinders 28.

(3) Next, the air cylinders 28 are let protrude to cancel lock of the chuck mechanisms 19, so that the lock pins 20 can be drawn.

(4) By lifting the upper rim 5 in this lock cancellation state, the lower rim 4 hanged and supported by engagement between the flange claws 50 and the inward flange member 51 is lifted together with the upper rim 5 as shown in FIG. 10.

(5) When the upper rim 5 is lifted to the stand-by position, prepared upper and lower rims 4, 5 of different size are replaced and set on the axis x. The turret method is adopted for this replacement and setting. In this method, grip mechanisms are respectively provided at plural positions in the circumferential direction of a lifting and lowering member. In each of the grip mechanisms, upper and lower rims 4, 5 of different size (the lower rim 4 is supported and suspended by the upper rim 5) are installed, and by swinging the lifting and lowering member, rims to be used are replaced. It should be noted that the lower rim 4 supported in each of the grip mechanisms is set at a turning position where the lower rim is turned anti-clockwise by the predetermined angle θ from the above reference position s.

(6) When the rim replacement in the lifting and lowering device is completed, the lifting and lowering device is lowered and the upper and lower rims 4, 5 are carried onto the spindle 2. The downward-toothed upper side coupling 17B is provided in a lower part of the lowered lower rim 4, and the upward-toothed lower side coupling 17A is provided in the upper part of the spindle 2. When the upper side coupling 17B is mounted on the lower side coupling 17A, the upper side coupling 17B is coaxially coupled to the lower side coupling 17A by meshing of the teeth.

It should be noted that as shown in FIG. 6, a light projection optical fiber 56 and a light receiving optical fiber 57 whose optical path is set to horizontally cross the meshing part of the Hirth coupling 17 are arranged on the upper surface of the main frame 1 to face each other. When a large gap is generated in the meshing part of the upper side coupling 17B and the lower side coupling 17A, by sensing passage of light from the light projection optical fiber 56 to the light receiving optical fiber 57, the meshing failure is detected, the following actions are automatically stopped, and processing such as an alarm action is performed.

Such detection of the meshing failure is effective for detection of the following failure. That is, after finishing measurement, at the time of lifting the upper rim 5, due to firm adherence of a tire bead portion to the upper rim 5 and the lower rim 4, the lower rim 4 is sometimes integrally brought up with the upper rim 5 via the tire W. When such a state is generated, a large gap is generated in the meshing part of the Hirth coupling 17. The above detection of the meshing failure is effective for detecting such gap generation.

(7) The lock pins 20 of the lower rim 4 turned anti-clockwise by the predetermined angle θ from the reference position s face the chuck mechanisms 19. At this time, since the chuck mechanisms 19 are preliminarily brought into the lock cancellation state by the air cylinders 28, the lock pins 20 are smoothly inserted into the chuck mechanisms 19 following lowering of the lower rim 4.

(8) When the lower rim 4 is lowered to a lower limit and the lock pins 20 are inserted into the chuck mechanisms 19, the chuck mechanisms 19 are brought into the lock state by retreat of the air cylinders 28, so that fixing of the lower rim 4 aligned with and coupled to the spindle 2 by the Hirth coupling 17 is completed.

(9) In this case, even after the lower rim 4 is lowered to the lower limit, the upper rim 5 is further lowered until the flanges 50 pass through the inward flange member 21 to the lower side.

(10) When the above lower rim fixing action is completed, the spindle 2 and the lower rim 4 are controlled to be rotated inversely (clockwise) by the predetermined angle θ and returned to the reference position s again. Thereby, the flange claws 50 can pass through the inward flange member 51 to the upper and lower sides.

(11) After that, by largely lifting the upper rim 5 to the stand-by position, the rim exchange is finished.

(Other Embodiments)

The present invention can also be implemented in the following modes.

(1) The above embodiment has the structure that in the chuck mechanisms 19, the operation tubes 24 biased in the lock state are driven and moved in the lock cancellation direction by the air cylinders 28, so that the movement of the lock balls 25 serving as the engagement members is controlled. However, various other modes of chuck mechanisms 19 can be selected. For example, a structure that an engagement member such as a sliding type lock shaft and a turning type hook member is driven and moved directly by an actuator such as an air cylinder, an electromagnetic solenoid, and a motor can be adopted as the chuck mechanisms 19.

(2) The present invention is not limited to a case where the rims are automatically exchanged by automatically controlling or remotely controlling the actuator but can similarly be implemented in a mode where the rims are manually exchanged, for example a worker brings and exchanges the lower rim. Even in this case, there is no need for a centering task, a re-correction task, and a bolt fastening task.

(3) In the above embodiment, the lower rim is also carried in and out by utilizing lifting and lowering of the upper rim 5. However, the lower rim 4 can also be carried in and out by another exclusive means.

(4) As means for detecting the meshing failure of the Hirth coupling 17, a contact or contactless position sensor such as a limit switch and a proximity switch can also be used.

The invention claimed is:

1. A rim exchange device in a tire balance measurement apparatus for driving and rotating upper and lower rims nipping a tire by a spindle coupled to the lower rim and measuring dynamic balance of the tire, the rim exchange device comprising:
   a coupling having an automatic alignment function; and
   a chuck mechanism, wherein
   the coupling has an upper side coupling coaxially coupled and fixed to the lower rim, and a lower side coupling coaxially coupled and fixed to the spindle,
   the upper side coupling is meshed with the lower side coupling, and
   the chuck mechanism prevents upward separation of the lower rim from the spindle;
   wherein the chuck mechanism has a lock member provided in the lower rim, and an engagement member provided on the spindle side and engaged with the lock member; and
   wherein the lock member and engagement member are positioned on an outer peripheral side of the coupling.

2. The rim exchange device in the tire balance measurement apparatus according to claim 1, further comprising:
   an actuator for driving and operating the engagement member.

3. The rim exchange device in the tire balance measurement apparatus according to claim 1, wherein the upper rim to be lifted and lowered is capable of supporting and suspending the lower rim.

4. A rim exchange device in a tire balance measurement apparatus for driving and rotating upper and lower rims nipping a tire by a spindle coupled to the lower rim and measuring dynamic balance of the tire, the rim exchange device comprising:
   a coupling having an automatic alignment function; and
   a chuck mechanism, wherein
   the coupling has an upper side coupling coaxially coupled and fixed to the lower rim, and a lower side coupling coaxially coupled and fixed to the spindle,
   the upper side coupling is meshed with the lower side coupling, and
   the chuck mechanism prevents upward separation of the lower rim from the spindle; and
   further comprising: detection means for detecting meshing failure between the upper side coupling and the lower side coupling.

* * * * *